United States Patent

Schmidt

[11] 4,071,070
[45] Jan. 31, 1978

[54] MOLDED VEHICULAR TIRE WITH INTERNAL REINFORCING WEBS

[76] Inventor: Oskar Schmidt, Chicago 5, Kittsee, Austria, 2421

[21] Appl. No.: 667,498

[22] Filed: Mar. 17, 1976

[30] Foreign Application Priority Data

Mar. 24, 1975 Austria .............................. 2302/75

[51] Int. Cl.² .................. B60C 5/00; B60C 17/00
[52] U.S. Cl. .................................. 152/333; 152/328
[58] Field of Search ............. 152/328, 329, 333, 334, 152/335, 318, 319, 320, 321, 322, 338, 323–327

[56] References Cited

U.S. PATENT DOCUMENTS

| | | | |
|---|---|---|---|
| 1,216,893 | 2/1917 | Vierengel | 152/333 |
| 1,383,818 | 7/1921 | Kirby | 152/328 |
| 1,495,768 | 5/1924 | Braden | 152/328 |
| 2,053,245 | 9/1936 | Girz | 152/338 |
| 2,493,731 | 1/1950 | Watter | 152/333 |
| 2,620,845 | 12/1952 | Lord | 152/328 |
| 3,977,453 | 8/1976 | Coran et al. | 152/323 |

FOREIGN PATENT DOCUMENTS 180,161   7/1962   Sweden .............................. 152/333

Primary Examiner—Drayton E. Hoffman
Attorney, Agent, or Firm—Karl F. Ross

[57] ABSTRACT

A molded vehicular tire is internally partitioned by a set of angularly equispaced webs integral with its toroidal casing, the webs being separated from the inner wall surfaces of the casing by arcuate gaps extending laterally from the region of its sole but terminating short of its beads. The webs, attached to the tire casing at three points, act as reinforcements allowing the tire to be used even without internal air pressure.

6 Claims, 5 Drawing Figures

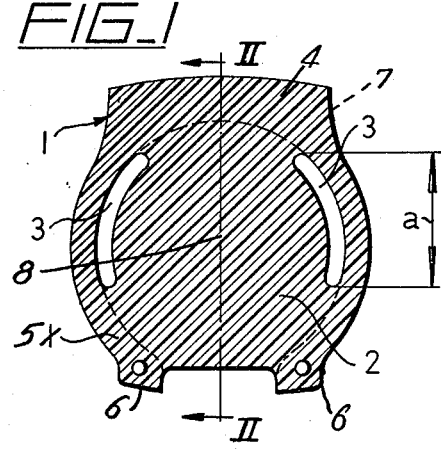
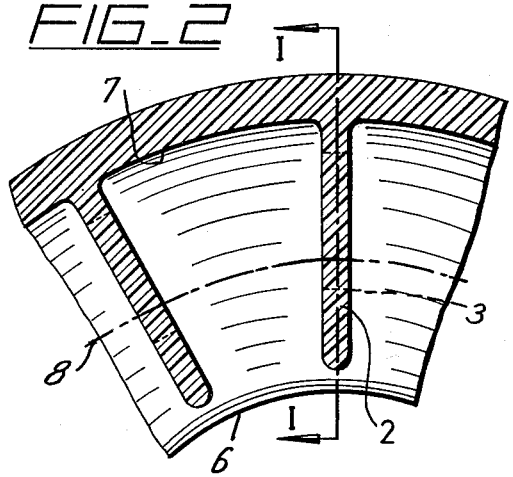
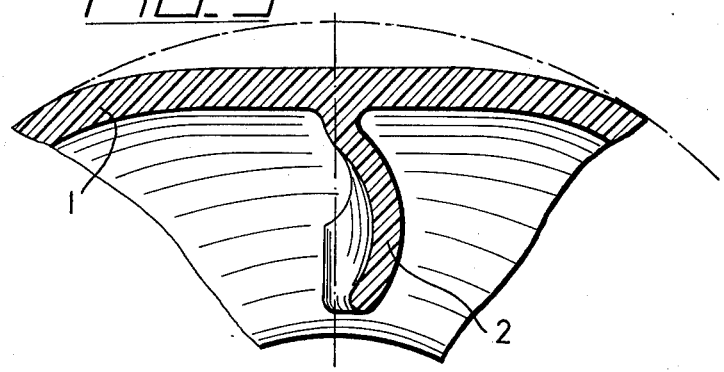
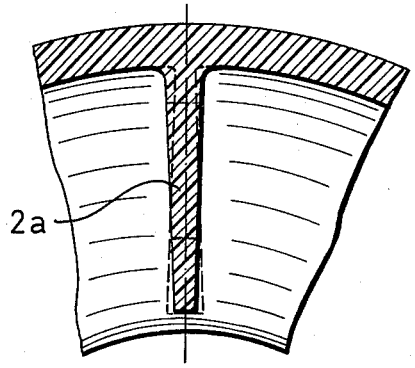
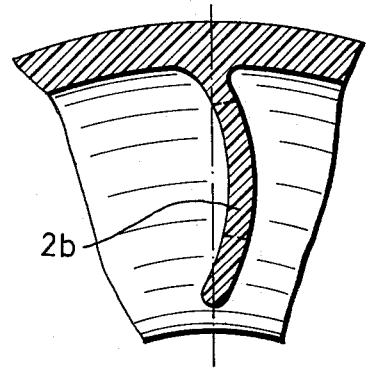

MOLDED VEHICULAR TIRE WITH INTERNAL REINFORCING WEBS

My present invention relates to a molded vehicle tire made of plastics, particularly of polyurethane elastomers.

It has already been suggested, with tires made of natural or synthetic rubber or plastics, to reinforce the tire casing by internal ribs or webs integrally formed with the tire body and uniformly spaced around the circumference thereof. With the ribs continuously attached to opposite inner wall surfaces of the tire casing, ruptures have been found to occur in the radially outer part of the sidewalls, i.e. in a zone of maximum deformation, after a relatively short time, thus rendering the tire useless.

The object of my present invention, therefore, is to provide an improved tire construction of the character set forth, with reinforcing webs allowing the tire to be used even without internal air pressure, which obviates the aforedescribed drawback.

I have found, in accordance with my present invention, that the danger of ruptures between a set of generally radial internal webs and the sidewalls of a tire casing of the usual toroidal configuration, flanking the sole of the tire, is avoided if the webs are separated from the sidewalls by arcuate lateral gaps extending from the region of the sole toward the annular inner rims or beads by which these sidewalls are bounded. With the gaps terminating short of these transversely spaced beads, each web is integrally attached to the casing at three points, namely at the sole and in the vicinity of the beads; thus, in the absence of internal air pressure, the webs transmit the loading force of the road directly to the beads while letting the sidewalls deform freely along the gaps. Particularly with synthetic elastomeric materials such as polyurethanes, cord or steel-ply reinforcements in the tire body become unnecessary with this construction.

The webs need not lie in precisely radial planes. Thus, their thickness may decrease radially inwardly for better stress distribution; they could also be of curvilinear cross-section, as where a higher flexibility is desired.

The invention will now be described in detail with reference to the accompanying drawing in which:

FIG. 1 is a cross-sectional view of a tire embodying my invention, taken on the line I — I of FIG. 2;

FIG. 2 is a fragmentary sectional view taken on the line II — II of FIG. 1;

FIG. 3 is a view similar to FIG. 2, showing the tire deformed under load; and

FIGS. 4 and 5 are views similar to FIG. 2, showing modified tires according to my invention.

The tire shown in the drawing has a casing 1 of conventional shape, forming a sole 4 in contact with the road and a pair of sidewalls 5 terminating in respective beads 6. The toroidal interior 7 of the casing has a centerline 8 about which the sidewalls 5 are curved so that the tire body has its maximum width at the level of that centerline.

As illustrated in FIGS. 1 and 2, the tire casing 1 is internally partitioned and reinforced by a multiplicity of radial webs 2 disposed at angularly equispaced locations inside the tire, the webs being formed integrally with the tire casing 1 and spaced from its sidewalls 5 by arcuate gaps 3 extending from the region of the tire sole 4 toward the beads 6. FIG. 3 shows the flexing of one of the webs 2 due to the deformation of the tire casing 1 caused by heavy load. The number of the webs 2 depends primarily on their thickness and the requirements which the tire shall meet. Normally, the tire is of the pneumatic type, and the webs 2 facilitate driving under emergency conditions caused by loss of air pressure.

However, other embodiments are possible wherein no air pressure is used and the flexibility of the tire casing 1 is made dependent solely on the shape of the webs. Thus, I may provide the tire with webs 2a or 2b of tapering or curvilinear cross-section, respectively, as shown in FIGS. 4 and 5, for an unloaded tire.

It is noted that the tire according to the invention is of a significantly increased axial stiffness which is of great advantage with respect to the steering characteristics of a vehicle.

As will be apparent from FIGS. 1 and 2, the length a of each gap 3 is sufficient to let the gap extend radially inwardly past the zone of maximum thickness of the tire body.

I claim:

1. In a molded vehicular tire whose body comprises a toroidal casing with a sole and with a pair of axially separated oppositely outwardly bulging sidewalls bounded by axially spaced annular beads remote from said sole, the interior of said casing being partitioned into a multiplicity of air-filled compartments by as many peripherally separated, generally radial webs, the improvement wherein each of said webs is integrally attached to said casing only at said sole and in the vicinity of said beads while terminating short of said sidewalls throughout a zone extending from the region of said sole toward said beads past a line of maximum axial spacing of said sidewalls whereby the periphery of each web is separated from said sidewalls in said zone by a pair of arcuate lateral gaps interconnecting adjacent compartments.

2. A tire as defined in claim 1 wherein said webs are angularly equispaced.

3. A tire as defined in claim 2 wherein said webs are of radially inwardly decreasing thickness.

4. A tire as defined in claim 1 wherein said webs are of curvilinear cross-section.

5. A tire as defined in claim 1 wherein said casing and said webs consist of synthetic elastomeric material.

6. A tire as defined in claim 5 wherein said elastomeric material is a polyurethane.

* * * * *